May 25, 1954 W. A. BYCHINSKY 2,679,627
SPARK PLUG TESTER
Filed July 19, 1950
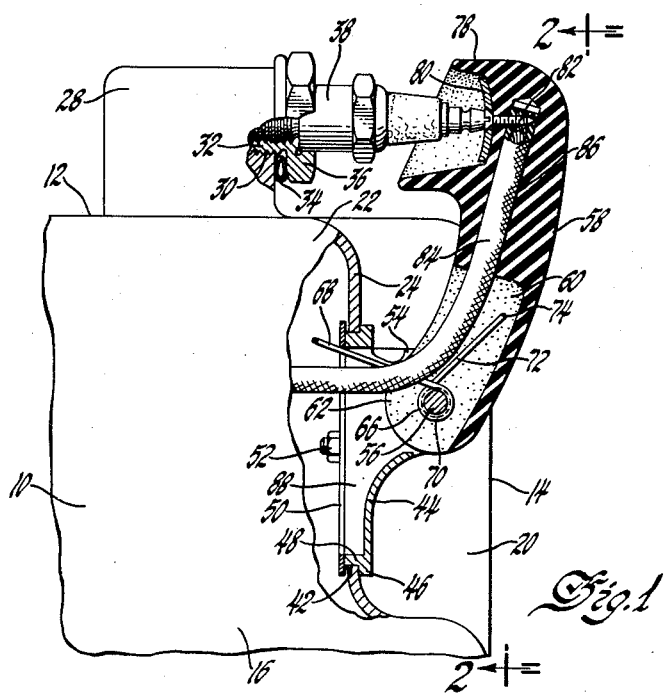
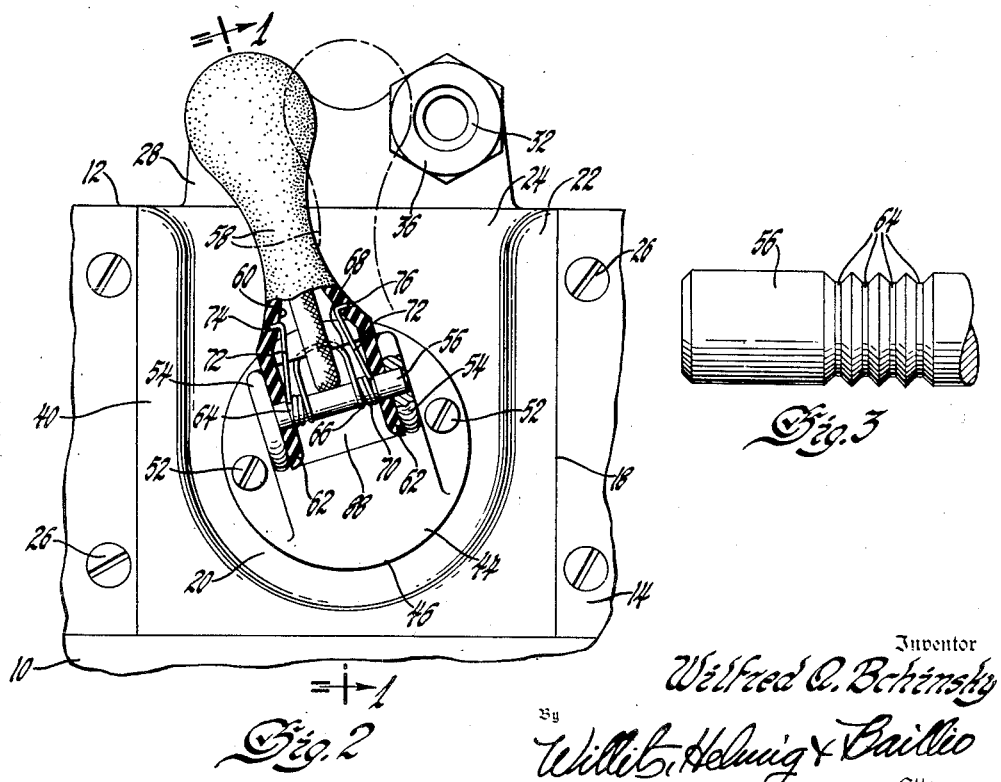
Inventor
Wilfred A. Bchinsky
By
Willett, Helwig & Baillio
Attorneys

UNITED STATES PATENT OFFICE 2,679,627

SPARK PLUG TESTER

Wilfred A. Bychinsky, Ann Arbor, Mich., assignor to General Motors Corporation, Detroit, Mich., a corporation of Delaware Application July 19, 1950, Serial No. 174,743

10 Claims. (Cl. 324—15)

This invention relates to a spark plug testing machine and more particularly to an improved electrical contactor which may be employed to selectively supply higher voltage testing current to the spark plugs being tested.

The invention is illustrated on a spark plug testing machine in which two spark plugs are simultaneously mounted for testing. The spark plugs are inserted in a pressure chamber so that the pressure of the air surrounding the electrodes at the spark gap may be increased to simulate actual firing conditions during the operation of an internal combustion engine. The electric contact member of the spark plug tester apparatus is mounted on an arm swingable to and from the spark plug. The arm is pivotally mounted on a turntable member which is rotatably supported in a wall of the spark plug testing machine. Thus the spark plug testing machine terminal may be disconnected from the spark plug being tested by moving the arm back away from the spark plug. Then if it is desired to engage the testing machine contact member with another spark plug, the assembly consisting of the contactor arm and the turntable member is rotated until the contact member on the arm is in alignment with the other spark plug. Then the arm will be moved under the action of a spring to move and hold the contact member in contact with the terminal of the other spark plug.

A primary object of the invention is to provide an improved spark plug testing machine in which the electric contact member is mounted on an arm swingably and rotatably mounted on the housing of the spark plug testing machine so that it may be readily moved to successively contact several spark plugs.

Another object of the invention is to provide in a spark plug testing machine a high voltage electrical contact member mounted in an arm which is swingably mounted on a turntable member rotatably mounted in the testing machine housing, a resilient spring engaging the turntable and urging the arm in contact with the spark plug being tested. A further object of the invention is to provide in a swinging electric contact arm for spark plug testing machines a pintle having annular grooves to locate a looped halfbent spring which urges the contact arm into contact with the spark plugs being tested in the testing apparatus and to retain the pintle in position.

These and other objects of the invention will be more apparent from the following specification and drawing illustrating a preferred embodiment of the invention.

Figure 1 is a partial view of the spark plug apparatus with parts broken away to show the details of the electric contact structure.

Figure 2 is a partial elevation of the spark plug testing apparatus taken in the direction of the arrows 2—2 in Figure 1 and having parts broken away to show details of the electric contact structure.

Figure 3 is a partial detail of the pintle for the electric contact arm.

The invention is illustrated on a spark plug testing machine having a housing 10. The top wall and a portion of the front wall of the housing are illustrated in the drawing. This portion of the housing comprises a top wall 12 and a front wall 14 and side wall 16. The centers of the top wall 12 and the front wall 14 of the housing have an opening 18 formed therein. A test chamber casting 20 having a top wall portion 22 and a recessed front wall portion 24 is positioned in the opening 18. The casting 20 is suitably formed so that it will fit flush with the top wall 12 and front wall 14 in the housing and has a portion (not shown) extending under these walls so that it may be suitably secured thereto by suitable machine screws or bolts 26. A pressure chamber 28 is formed integrally with the top wall portion 22 and extends across the machine. The pressure chamber 28 has a threaded aperture 30 at each end which faces the front of the machine. A suitable adaptor 32 is screwed into the aperture 30 to provide for different size spark plugs. A gasket 34 is provided between the front wall of the pressure chamber 28 and the flange 36 of the adaptor. A conventional spark plug 38 is then secured in both the adaptors 32 for testing.

The central portion 24 of the front wall is recessed and connects with the suitable flange portion 40 around the perimeter of the pressure chamber casting to make the flush connection with the testing apparatus housing 10. A circular aperture 42 is centrally located in the wall 24. A turntable member 44 is rotatably positioned in the aperture 42. The turntable member has a flange 46 engaging the wall 24 around the aperture 42 and a cylindrical bearing portion 48 which fits in the aperture 42. The turntable member 44 is rotatably secured in the aperture 42 by a washer 50 which has suitable enlargements at each side to receive the bolts 52 which fasten the washer 50 to the turntable 44 and thus secure the turntable in position in the aperture.

The turntable 44 has on the forward side two integrally formed ears 54 which have suitable apertures to support the pintle 56.

The contactor arm 58 has a hollow portion 60 in the lower end which forms opposed ears 62. The ears 62 are suitably apertured to pivotally mount the arm on the pin 56. The pin 56 adjacent the ears 62 has a series of annular ridges 64 illustrated in Figure 3. The hairpin spring 66 holds the arm 58 in contact with the spark plug and is formed to provide an inner U-shaped base portion 68 which engages the turntable member 44 or washer 50 and legs 72. A plurality of loops 70 in each leg 72 wraps around pintle pin 56 and fit in the grooves 64 to hold the hairpin spring 66 and pintle 56 in position. The leg portions 72 of the hairpin spring 66 beyond the loops 70 extend along the length of the arm adjacent the ears 62. The ends 74 of the hairpin spring legs 72 are bent at right angles and fit in apertures 76 in the arm 58. The top portion of the arm 58 is solid and has an inwardly directed substantially cylindrical shield member 78 formed integrally therewith. In the base of the cavity formed by the cylindrical shield 78 a circular electrical contact member 80 is positioned and secured by a screw 82 which extends into a cable 84 located in a suitable passage 86 in the center of the arm 58. The screw 82 secures the contact member 80 in the recess formed by the shield and provides an electric connection between the electric cable 84 and the contactor 80. The electric cable 84 extends downwardly between the ears 62 and above the pintle 56 and through the central opening 88 in the turntable 44.

The high voltage test current is supplied by a magnetic shunt type transformer which may be located in the housing. One terminal of the transformer secondary is connected to ground while the other terminal is connected to the spark plug being tested by cable 84. A transformer having an output of 14,000 volts in the secondary when the input is 110 volts at 60 cycles in the primary winding is suitable for use in this testing machine. In order to reduce the high frequency current and to provide a more uniform voltage the cable 84 has a high ohmic resistance. The cable is made by impregnating a woven fiber cord with finely powdered graphite. The cord may be made of linen, rayon, nylon, cotton and other fibers. A cable made of linen and rayon and impregnated in accordance with the method employed in the copending application Serial No. 208,930, filed February 1, 1951, by Ross W. Buchanan, Robert W. Smith and Taine G. McDougal on a High Ohmic Resistance Conductor will provide the proper resistance and operate properly. The high ohmic resistance of the cable 84 decreases the amperage at the spark plug under test. Thus the electric current supplied to the spark plug is not dangerous. The more uniform voltage applied to the spark plug when the high ohmic resistance cable is employed improves the quality and accuracy of the test performed on this machine. In addition by using the high ohmic resistance cable to conduct the high voltage current from the transformer to the spark plug terminal, the high frequency current is reduced and the objectionable radio interference is eliminated. When the tester is employed as a comparison tester, the new or standard spark plug may be left in position over an extended period and become burned or eroded. The resistor cable substantially reduces the burning of the electrodes of the standard spark plug.

In the testing apparatus when it is desired to test one or more spark plugs in order to test a plurality at the same time or to compare spark plugs, the spark plugs are positioned in a suitable pressure chamber 28 having a plurality of outlets 30. The high voltage electric test current is supplied from a suitable transformer system (not shown) by the cable 84. The cable is attached to the contactor arm 58 and the electric contact member 80. The arm 58 is suitably mounted so that it may swing to and from the spark plug about pivot pin 56. A hairpin spring 66 normally urges the electric contactor 80 in contact with the terminal spark plug 38. The arm is swingably mounted on the pin 56 which is retained in the turntable 44 by the spring loops partially engaging the grooves 64. Though the spring loops are helical and the grooves are annular, they will engage sufficiently to retain the pintle in position and thus the additional cost of the helical grooves is not justified. The turntable is rotatably mounted by the flange 46, washer 50 on the front wall 24 of the testing chamber member. Thus the spark plug contactor member may be readily swung into or out of engagement with the spark plug terminal and rotated from one to another spark plug in order to test the plurality of spark plugs.

The above specification and drawing illustrate a specific embodiment of the invention. The invention is capable of numerous modifications by those skilled in the art within the scope of the appended claims.

I claim:

1. In a contactor, a support, means to mount a terminal on said support, a turntable member rotatably mounted on said support, a contactor arm pivotally mounted on said turntable member by a pin, a hairpin spring having a plurality of loops wrapped around said pin, said pin having a plurality of recesses to engage said loops, one end of said hairpin spring engaging said turntable, the other end of said hairpin spring engaging said arm, said arm having an electrical contact member engaging said terminal, and said spring urging said contact member into engagement with said terminal.

2. In a contactor, a support, a pressure chamber on said support, means to mount a member having a terminal in said pressure chamber, a turntable member rotatably mounted on said support, a contactor arm pivotally mounted on said turntable member by a pin, a hairpin spring having a plurality of loops wrapped around said pin, said pin having a plurality of recesses to engage said loops to retain said spring and pin in position, one end of said hairpin spring engaging said turntable, the other end of said hairpin spring engaging said arm, said arm having an electrical contact member engaging said terminal, and said spring urging said contact member into engagement with said terminal.

3. In a contactor, a support, a turntable member rotatably mounted on said support, a contactor arm pivotally mounted on said turntable member by a pin, a hairpin spring having a loop wrapped around said pin, said pin having a recess to engage said loop to hold said hairpin spring and said pin in position, one end of said hairpin spring engaging said turntable, the other end of said hairpin spring engaging said arm, and said arm having an electrical contact member.

4. In a contactor, a support member, a turntable member rotatably mounted on said support, a contactor arm pivotally mounted on said turntable member by a pin, one of said members having opposed sides, a hairpin spring having a plurality of loops wrapped around said pin, said pin having means to engage said loops to hold the spring in place, said loops engaging said opposed sides to hold said pin in place, one end of said hairpin spring engaging said turntable, the other end of said hairpin spring engaging said arm, and said arm having an electrical contact member.

5. In a contactor, a support, means to mount a terminal on said support, a turntable member rotatably mounted on said support, a contactor arm having opposed sides pivotally mounted on said turntable member by a pin, a hairpin spring having a plurality of loops wrapped around said pin and engaging opposed sides of said contactor arm, said pin having means to laterally retain said loops and said pin in said support and said turntable member, one end of said hairpin spring engaging said turntable, the other end of said hairpin spring engaging said arm, said arm having an electrical contact member engaging said terminal, and said spring urging said contact member into engagement with said terminal.

6. In a spark plug testing machine, a housing, a pressure chamber mounted on said housing, an aperture in said housing adjacent said pressure chamber, means in said pressure chamber to mount a plurality of spark plugs an equal distance from said aperture, a turntable having an outer surface parallel to the housing adjacent said aperture rotatably mounted in said aperture, a pair of ears on said outer surface, a pin between said ears, a contactor arm swingably mounted on said pin, an electric contact member secured to said arm and positioned to engage the terminal of spark plugs positioned in said test chamber, a hairpin spring looped over said pin engaging said surface and said contactor arm to hold said contact member on said spark plug terminal, and means to conduct high voltage electric test current to said electric contact member.

7. In a spark plug testing machine, a housing, a pressure chamber mounted on said housing, means in said pressure chamber to mount a plurality of spark plugs, an aperture in said housing adjacent said pressure chamber, a turntable having an outer surface rotatably mounted in said aperture, said turntable having a pair of ears on the outer surface and an aperture through said turntable between said ears, a contactor arm swingably mounted on said ears of said turntable member, said contactor arm having a passage, an electric contact member extending through said aperture and said passage and secured to said arm and positioned to engage the terminal of spark plugs positioned in said test chamber, and means to conduct high voltage electric test current to said electric contact member.

8. In a pivot mechanism, a base member, a swingable member, an ear extending from each of said members, said plurality of ears having opposed sides, said ears having aligned apertures, a pin extending through said aligned apertures in said ears to pivot said swingable member on said base member, spring means having a plurality of loops extending around said pin adjacent said opposed sides with one end resiliently engaging said base member and the other end resiliently engaging said swingable member, grooves in said pin beneath said loops to prevent lateral movement of said loops relative to said spring with respect to said pin and said loops engaging opposed sides of said ears to prevent relative axial movement of said pin with respect to said ears.

9. In a pivot mechanism, a base member, a swingable member, each of said members having a portion laterally adjacent each other, said laterally adjacent portions having opposed sides and having aligned transverse apertures, a pin extending transversely through said aligned apertures in said portions to pivot said swingable member on said base member, spring means having a plurality of loops extending around said pin adjacent said opposed sides with one end resiliently engaging said base member and the other end resiliently engaging said swingable member, grooves in said pin beneath said loops to prevent lateral movement of said loops relative to said spring with respect to said pin and said loops engaging opposed sides of said portions to prevent relative axial movement of said pin with respect to said portions.

10. In a pivot mechanism, a base member, a swingable member pivotally mounted on said base member by a pin, a spring having a first portion engaging said pin and a second portion engaging said base member and a third portion engaging said swingable member to urge said swingable member in one direction, said pin being formed to receive said first portion of said spring to prevent relative lateral movement of said first spring portion and said pin, and said spring engaging one of said members to prevent lateral movement of said spring and said pin relative to said one member.

References Cited in the file of this patent

UNITED STATES PATENTS

| Number | Name | Date |
|---|---|---|
| 1,494,938 | Abbott | May 20, 1924 |
| 2,254,214 | Gage | Sept. 2, 1941 |
| 2,443,635 | Morris | June 22, 1948 |
| 2,491,156 | Bohn | Dec. 13, 1949 |
| 2,505,422 | Michaels | Apr. 25, 1950 |
| 2,551,990 | Wills | May 8, 1951 |
| 2,563,952 | Nichol | Aug. 14, 1951 |
| 2,574,876 | Lebus | Nov. 13, 1951 |

FOREIGN PATENTS

| Number | Country | Date |
|---|---|---|
| 114,246 | Australia | Nov. 17, 1941 |